United States Patent
Jimbo

(10) Patent No.: US 10,178,179 B2
(45) Date of Patent: Jan. 8, 2019

(54) INFORMATION DISTRIBUTION SYSTEM, INFORMATION DISTRIBUTION APPARATUS, AND INFORMATION DISTRIBUTION METHOD

(71) Applicant: Junya Jimbo, Tokyo (JP)

(72) Inventor: Junya Jimbo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 14/874,531

(22) Filed: Oct. 5, 2015

(65) Prior Publication Data
US 2016/0105492 A1 Apr. 14, 2016

(30) Foreign Application Priority Data

Oct. 9, 2014 (JP) .................... 2014-208247

(51) Int. Cl.
*H04L 29/08* (2006.01)
*G06Q 30/02* (2012.01)
*G06Q 10/00* (2012.01)
*G06Q 30/06* (2012.01)

(52) U.S. Cl.
CPC ........... *H04L 67/125* (2013.01); *G06Q 10/20* (2013.01); *G06Q 30/02* (2013.01); *G06Q 30/0623* (2013.01); *G06Q 30/0631* (2013.01); *H04L 67/22* (2013.01)

(58) Field of Classification Search
CPC ..... G06F 3/12; H04L 43/0817; H04L 67/125; H04L 67/22; G06Q 10/20; G06Q 30/02; G06Q 30/0623; G06Q 30/0631
See application file for complete search history.

(56) References Cited

U.S. PATENT DOCUMENTS

| | | | | |
|---|---|---|---|---|
| 2002/0188504 A1* | 12/2002 | Whale | ............... | G06Q 10/087 705/14.41 |
| 2003/0046171 A1* | 3/2003 | Whale | ............... | G06Q 30/02 705/7.35 |
| 2010/0198939 A1* | 8/2010 | Raleigh | ............... | H04L 41/0806 709/217 |
| 2014/0229724 A1* | 8/2014 | Chen | ............... | G06F 9/4405 713/2 |
| 2014/0378091 A1* | 12/2014 | Irwin | ............... | H04M 15/59 455/405 |
| 2015/0370616 A1* | 12/2015 | Peterson | ............... | G06F 9/541 719/320 |

FOREIGN PATENT DOCUMENTS

| | | |
|---|---|---|
| JP | 2007-087017 | 4/2007 |
| JP | 2012-161023 | 8/2012 |

* cited by examiner

*Primary Examiner* — Gil H. Lee
(74) *Attorney, Agent, or Firm* — IPUSA, PLLC

(57) ABSTRACT

An information distribution system in which an electronic device and an information distribution apparatus are connected to each other via a network, includes a device usage information collecting unit configured to collect device usage information of the electronic device; a distribution information generating unit configured to generate, as distribution information, information of an alternative product or an additional product with respect to the electronic device, based on the device usage information; and a distributing unit configured to distribute the distribution information to the electronic device.

5 Claims, 14 Drawing Sheets

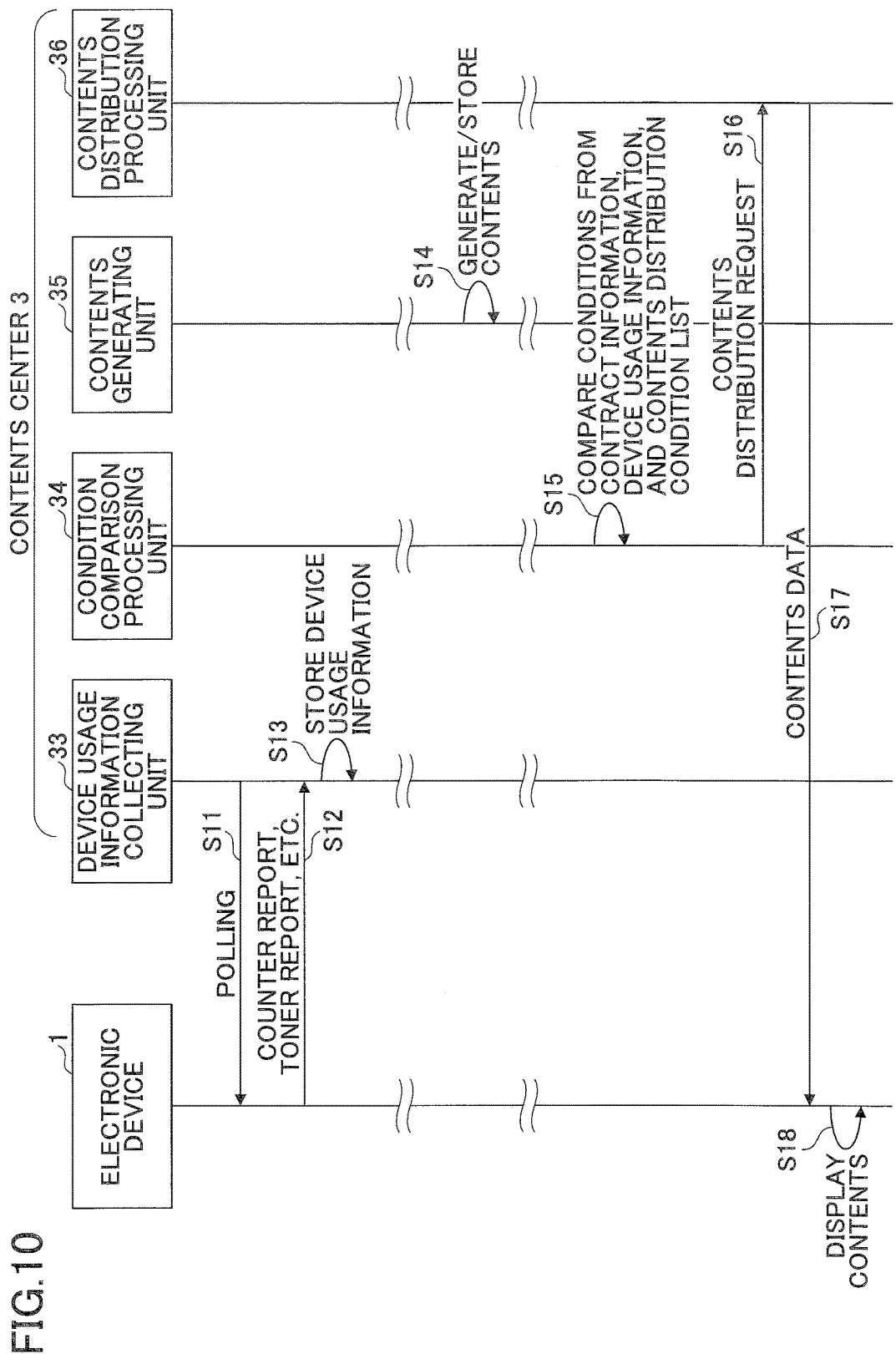

FIG.12B

3) RECOMMENDATION INFORMATION
THERE ARE PERIODS WHERE THE PRINT USAGE FREQUENCY IS VERY HIGH, AND THE BUSINESS EFFICIENCY MAY BE REDUCED. BY REPLACING WITH PRODUCT A HAVING A HIGH PROCESSING CAPABILITY, OR BY ADDITIONALLY INSTALLING PRODUCT B, IT IS POSSIBLE TO IMPROVE THE BUSINESS EFFICIENCY IN BUSY SEASONS.

DIGITAL FULL COLOR
MULTIFUNCTION PERIPHERAL

RICOH MP C6003/C5503 C4503
MP C3503/C3003 SERIES

| | MAIN UNIT STANDARD PRICE | PRINTING SPEED (A4 HORIZONTAL) |
|---|---|---|
| MP C6003 | 2,440,000 YEN (NOT INCLUDING CONSUMPTION TAX) | COLOR 60 SHEETS/MINUTE, MONOCHROME 60 SHEETS/MINUTE |
| MP C5503 | 1,960,000 YEN (NOT INCLUDING CONSUMPTION TAX) | COLOR 55 SHEETS/MINUTE, MONOCHROME 55 SHEETS/MINUTE |
| MP C4503 | 1,710,000 YEN (NOT INCLUDING CONSUMPTION TAX) | COLOR 45 SHEETS/MINUTE, MONOCHROME 45 SHEETS/MINUTE |
| MP C3503 | 1,470,000 YEN (NOT INCLUDING CONSUMPTION TAX) | COLOR 35 SHEETS/MINUTE, MONOCHROME 35 SHEETS/MINUTE |
| MP C3003 | 1,250,000 YEN (NOT INCLUDING CONSUMPTION TAX) | COLOR 30 SHEETS/MINUTE, MONOCHROME 30 SHEETS/MINUTE |

PRODUCT A

DIGITAL FULL COLOR
MULTIFUNCTION PERIPHERAL

RICOH MP C305sp

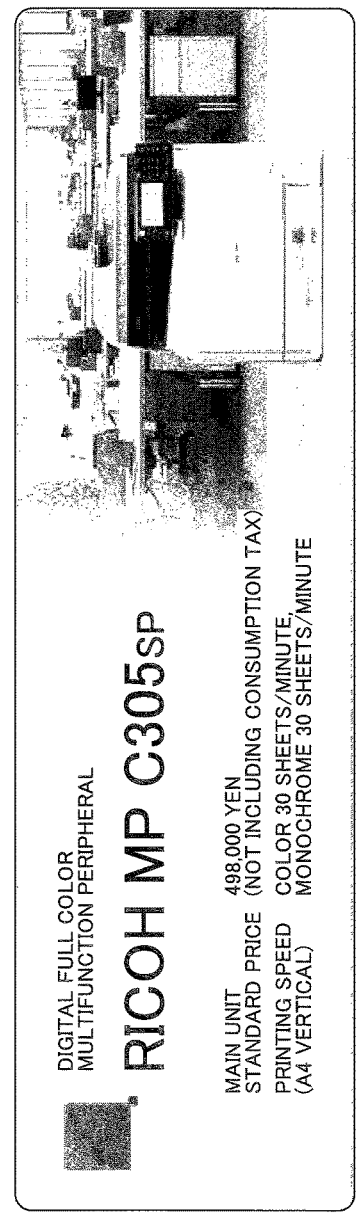

MAIN UNIT
STANDARD PRICE  498,000 YEN (NOT INCLUDING CONSUMPTION TAX)
PRINTING SPEED  COLOR 30 SHEETS/MINUTE,
(A4 VERTICAL)   MONOCHROME 30 SHEETS/MINUTE

PRODUCT B

FIG.14

1) OPERATION STATUS
TOTAL OPERATION TIME: 12301 HOURS
OPERATION RATE: 5%

2) RECOMMENDATION INFORMATION
THE SHELF LIFE OF THE LAMP IS APPROACHING.
ARTICLE A AND ARTICLE B ARE LAMPS THAT CAN BE MOUNTED.
YOUR USAGE FREQUENCY IS RELATIVELY LOW, AND THEREFORE
THE LOW-PRICED ARTICLE A IS RECOMMENDED.

| ARTICLE NAME | CATEGORY CODE | JAN CODE | STANDARD PRICE |
|---|---|---|---|
| IPSiO PJ REPLACEABLE LAMP TYPE 3 | 308942 | 4961311872112 | 30,000 YEN |

ARTICLE A

| ARTICLE NAME | CATEGORY CODE | JAN CODE | STANDARD PRICE |
|---|---|---|---|
| IPSiO PJ REPLACEABLE LAMP TYPE 6 | 308929 | 4961311872402 | 40,000 YEN |

ARTICLE B

INFORMATION DISTRIBUTION SYSTEM, INFORMATION DISTRIBUTION APPARATUS, AND INFORMATION DISTRIBUTION METHOD

BACKGROUND OF THE INVENTION

1. Field of the Invention

The present invention relates to an information distribution system, an information distribution apparatus, and an information distribution method.

2. Description of the Related Art

Presently, signage systems, which display images including various kinds of information by a display, a projector, etc., are being widely used. Particularly, it is known that it is effective to distribute and display advertisements, announcements, etc., by using a signage system.

Patent Document 1: Japanese Laid-Open Patent Publication No. 2012-161023

Patent Document 2: Japanese Laid-Open Patent Publication No. 2007-87017

SUMMARY OF THE INVENTION

The present invention provides an information distribution system, an information distribution apparatus, and an information distribution method, in which one or more of the above-described disadvantages are eliminated.

According to an aspect of the present invention, there is provided an information distribution system in which an electronic device and an information distribution apparatus are connected to each other via a network, the information distribution system including a device usage information collecting unit configured to collect device usage information of the electronic device; a distribution information generating unit configured to generate, as distribution information, information of an alternative product or an additional product with respect to the electronic device, based on the device usage information; and a distributing unit configured to distribute the distribution information to the electronic device.

According to an aspect of the present invention, there is provided an information distribution apparatus connected to an electronic device via a network, the information distribution apparatus including a device usage information collecting unit configured to collect device usage information of the electronic device; a distribution information generating unit configured to generate, as distribution information, information of an alternative product or an additional product with respect to the electronic device, based on the device usage information; and a distributing unit configured to distribute the distribution information to the electronic device.

According to an aspect of the present invention, there is provided an information distribution method executed by an electronic device and an information distribution apparatus in an information distribution system in which the electronic device and the information distribution apparatus are connected to each other via a network, the information distribution method including collecting device usage information of the electronic device; generating, as distribution information, information of an alternative product or an additional product with respect to the electronic device, based on the device usage information; and distributing the distribution information to the electronic device.

BRIEF DESCRIPTION OF THE DRAWINGS

Other objects, features and advantages of the present invention will become more apparent from the following detailed description when read in conjunction with the accompanying drawings, in which:

FIG. 10 is a sequence diagram of a process example of an embodiment;

FIG. 12B illustrates an example of distribution information (part 2);

FIG. 14 illustrates an example of distribution information (part 3).

DETAILED DESCRIPTION OF THE PREFERRED EMBODIMENTS

A description is given, with reference to the accompanying drawings, of embodiments of the present invention. Note that in the following description of embodiments, it is assumed that the mechanism of contents distribution for signage display is used for information distribution; however, a mechanism exclusively used for information distribution may be constructed, unrelated to signage.

<Configuration>

Figure 1:
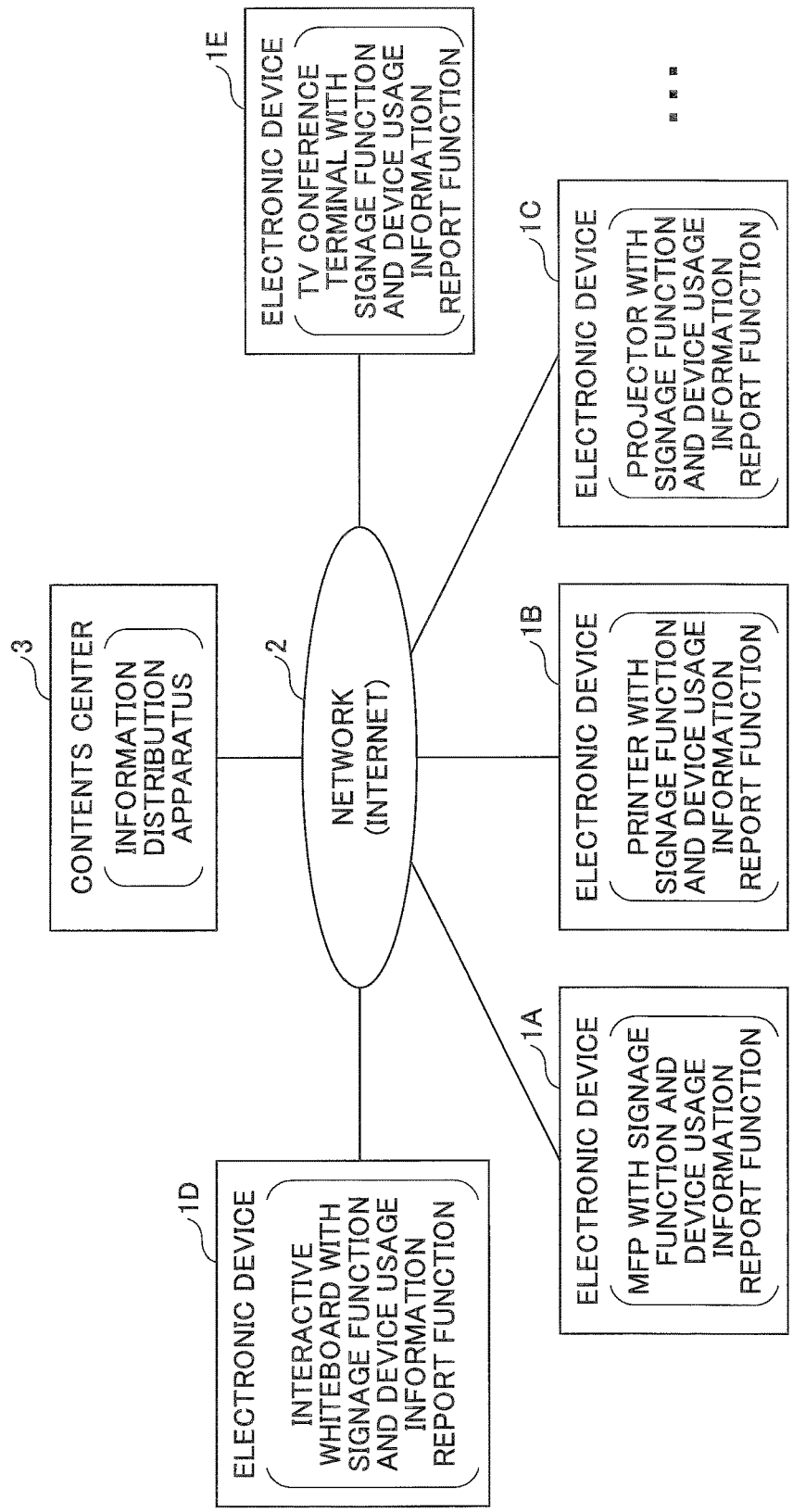
FIG. 1 illustrates a configuration example of a system according to an embodiment of the present invention.

FIG. 1 illustrates a configuration example of a system according to an embodiment of the present invention. In FIG. 1, the contents of information to be distributed is stored in a centralized manner in a contents center (information distribution apparatus, server apparatus) 3. The data of these contents is distributed to electronic devices 1A, 1B, 1C, . . . , via a network 2 such as the Internet. The electronic devices 1A, 1B, 1C, . . . are products having a signage function and a device usage information reporting function such as an MFP (Multi-Function Peripheral, Multi-Function Printer), a printer, a projector, and an interactive whiteboard; or products having functions of reporting device usage information and displaying contents, such as a TV conference terminal. Each of the electronic devices 1A through 1E, . . . has a unique device ID (identification information). The contents center 3 has a function of periodically extracting device usage information associated with the device IDs, implementing remote maintenance management, and distributing contents that vary according to the respective device IDs.

Figure 2:
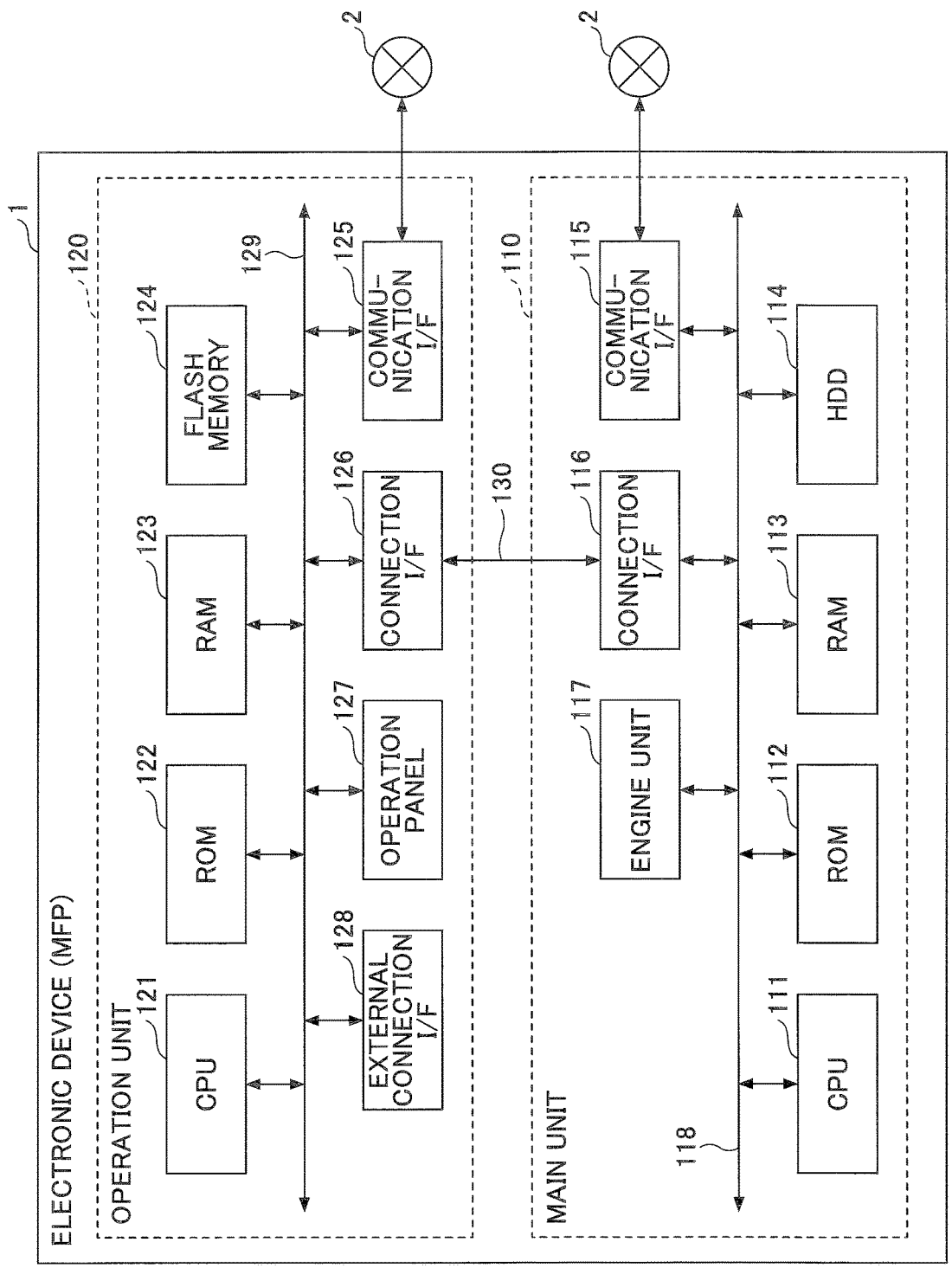
FIG. 2 illustrates a hardware configuration example of an electronic device.

FIG. 2 illustrates a hardware configuration example of the electronic device 1, which is an example of an MFP. As illustrated in FIG. 2, the electronic device 1 includes a main unit 110 capable of implementing various functions such as a copy function, a scanner function, a fax function, and a printer function; and an operation unit 120 for receiving operations of the user. Note that receiving operations of the user is a concept including receiving information (including signals indicating coordinate values of a screen) that is input according to the operation of the user. The main unit 110 and the operation unit 120 are communicatively connected to each other via an exclusively used communication channel 130. As the communication channel 130, for example, a communication channel of a USB (Universal Serial Bus) standard may be used; however, the communication channel may be of any standard that is wired or wireless. Note that the main unit 110 can perform operations according to operations received at the operation unit 120. Furthermore, the main unit 110 is able to communicate with an external apparatus such as a client PC (personal computer), and perform operations according to instructions received from the external apparatus.

The main unit 110 includes a CPU (Central Processing Unit) 111, a ROM (Read Only Memory) 112, a RAM (Random Access Memory) 113, a HDD (Hard Disk Drive) 114, a communication I/F (Interface) 115, a connection I/F 116, and an engine unit 117, which are connected to each other via a system bus 118.

The CPU 111 totally controls the operations of the main unit 110. The CPU 111 controls the overall operations of the main unit 110 by executing programs stored in the ROM 112 or the HDD 114, etc., by using the RAM 113 as a work area, and implements various functions such as a copy function, a scanner function, a fax function, a printer function, etc., described above. The communication I/F 115 is an interface for connecting with the network 2. The connection I/F 116 is an interface for communicating with the operation unit 120 via the communication channel 130. The engine unit 117 is a hardware element for performing general-purpose information processing and processes other than communication, for implementing a copy function, a scanner function, a fax function, a printer function. For example, the engine unit 117 includes a scanner (image reading unit) for scanning and reading an image of an original document, a plotter (image forming unit) for printing an image onto a sheet material such as a paper sheet, a fax unit for performing fax communication, etc. Furthermore, the engine unit 117 may include particular options such as a finisher for sorting the sheet materials on which printing has been performed, and an ADF (Auto Document Feeder) for automatically feeding an original document.

The operation unit 120 includes a CPU 121, a ROM 122, a RAM 123, a flash memory 124, communication I/F 125, a connection I/F 126, an operation panel 127, and an external connection I/F 128, which are connected to each other via a system bus 129. The CPU 121 totally controls the operations of the operation unit 120. The CPU 121 controls the overall operations of the operation unit 120 by executing programs stored in the ROM 122 or the flash memory 124, etc., by using the RAM 123 as a work area, and implements various functions such as displaying information (images) according to input received form the user. The communication I/F 125 is an interface for connecting with the network 2. The connection I/F 126 is an interface for communicating with the main unit 110 via the communication channel 130. The operation panel 127 receives various kinds of input according to operations by the user, and displays various kinds of information (for example, information according to the received operation, information indicating the operation status of the electronic device 1, information indicating a setting state, etc.). Here, the operation panel 127 is assumed to be a liquid crystal display (LCD) device including a touch panel function; however, the present embodiment is not so limited. For example, the operation panel 127 may be constituted by an organic EL (Electro-Luminescence) display device including a touch panel function. Furthermore, in addition, or alternatively, a display unit including an operation unit such as hardware keys and a lamp, may be provided. The external connection I/F 128 is an interface for connecting with a device such as an IC card reader.

Figure 3:
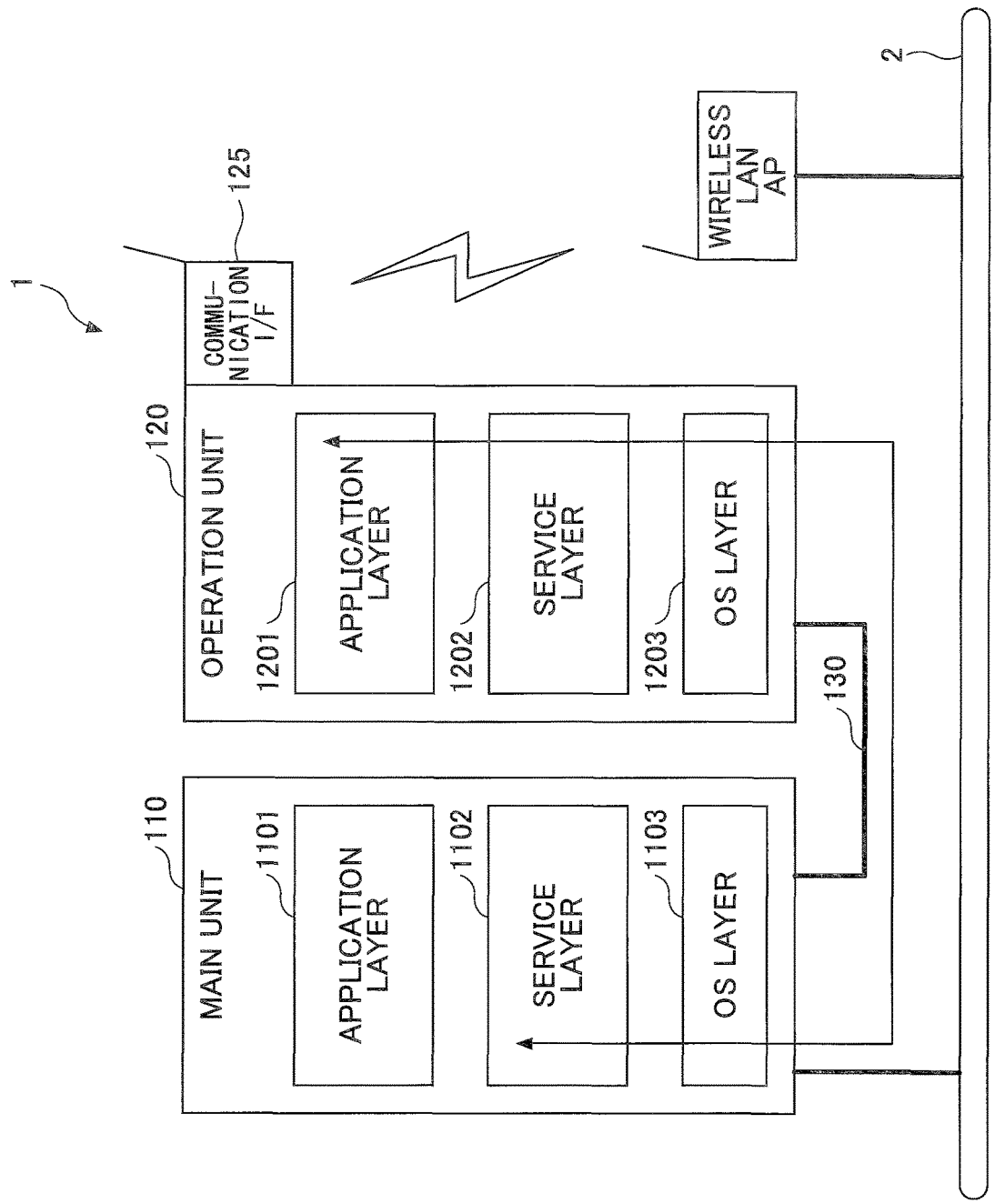
FIG. 3 illustrates an example of a software hierarchy of the electronic device.

FIG. 3 illustrates an example of a software hierarchy of the electronic device 1, which is an MFP. In FIG. 3, the main unit 110 includes an application layer 1101, a service layer 1102, and an OS layer 1103. The entities of the application layer 1101, the service layer 1102, and the OS layer 1103 are various software elements stored in the ROM 112, the HDD 114, etc., illustrated in FIG. 2. Various functions are provided as the CPU 111 executes these software elements.

The software of the application layer 1101 is application software (hereinafter, also simply referred to as "application") for providing a predetermined function by causing the hardware resources to operate. Examples of the application are a copy application for providing a copy function, a scanner application for providing a scanner function, a fax application for providing a fax function, and a printer application for providing a printer function.

The software of the service layer 1102 is interposed between the application layer 1101 and the OS layer 1103, and provides an interface with respect to the application for using the hardware resources included in the main unit 110. More specifically, the software is for providing functions of receiving an operation request with respect to the hardware resources and performing arbitration of the operation request. An operation request received by the service layer 1102 is, for example, a request for reading by the scanner or a request for printing by the plotter. Note that the interface function of the service layer 1102 is not only provided for the application layer 1101 of the main unit 110, but also for an application layer 1201 of the operation unit 120. That is, the application of the application layer 1201 of the operation unit 120 may also implement a function using the hardware resources (for example, the engine unit 117) of the main unit 110, via the interface function of the service layer 1102.

The software of the OS layer 1103 is basic software (operating system) for providing the basic function of controlling the hardware included in the main unit 110. The software of the service layer 1102 converts a request to use hardware resources from various applications into a command that can be interpreted by the OS layer 1103, and passes the command to the OS layer 1103. Then, as the software of the OS layer 1103 executes the command, the hardware the hardware resources perform operations according to the request of the application.

Similarly, the operation unit 120 includes an application layer 1201, a service layer 1202, and an OS layer 1203. The application layer 1201, the service layer 1202, and the OS layer 1203 included in the operation unit 120 have the similar hierarchal structure as that of the main unit 110. However, the functions provided by the applications of the application layer 1201 and the types of operation requests that can be received by the service layer 1202 are different from those of the main unit 110. The applications of the application layer 1201 may be software for providing predetermined functions by causing the hardware resources included in the operation unit 120 to operate; however, the applications of the application layer 1201 are mainly software for providing a function of a UI (user interface) for performing operations and displaying information relevant to functions of the main unit 110 (copy function, scanner function, fax function, printer function).

Note that in the configuration example in FIG. 3, in order to maintain the independence of the functions, the software of the OS layer 1103 of the main unit 110 and the software of the OS layer 1203 of the operation unit 120 are different from each other. That is, the main unit 110 and the operation unit 120 operate separately from each other by different operating systems. For example, Linux (registered trademark) may be used as the software of the OS layer 1103 of the main unit 110, and Android (registered trademark) may be used as the software of the OS layer 1203 of the operation unit 120.

The main unit 110 and the operation unit 120 operate by different operating systems, and therefore the communication between the main unit 110 and the operation unit 120 is performed as communication between different devices, and not as communication between processes in a common device. The communication includes an operation (command communication) of transmitting information (instruction contents from the user) received by the operation unit 120 to the main unit 110, and an operation of reporting an event from the main unit 110 to the operation unit 120. Here, the functions of the main unit 110 can be used as the operation unit 120 performs command communication with the main unit 110. Furthermore, examples of an event reported from the main unit 110 to the operation unit 120 are the execution status of an operation in the main unit 110 and contents set in the main unit 110. Furthermore, the power supply to the operation unit 120 is supplied from the main unit 110 via the communication path 130, and therefore the power source control of the operation unit 120 can be performed separately from (independently of) the power source control of the main unit 110.

Figure 4:
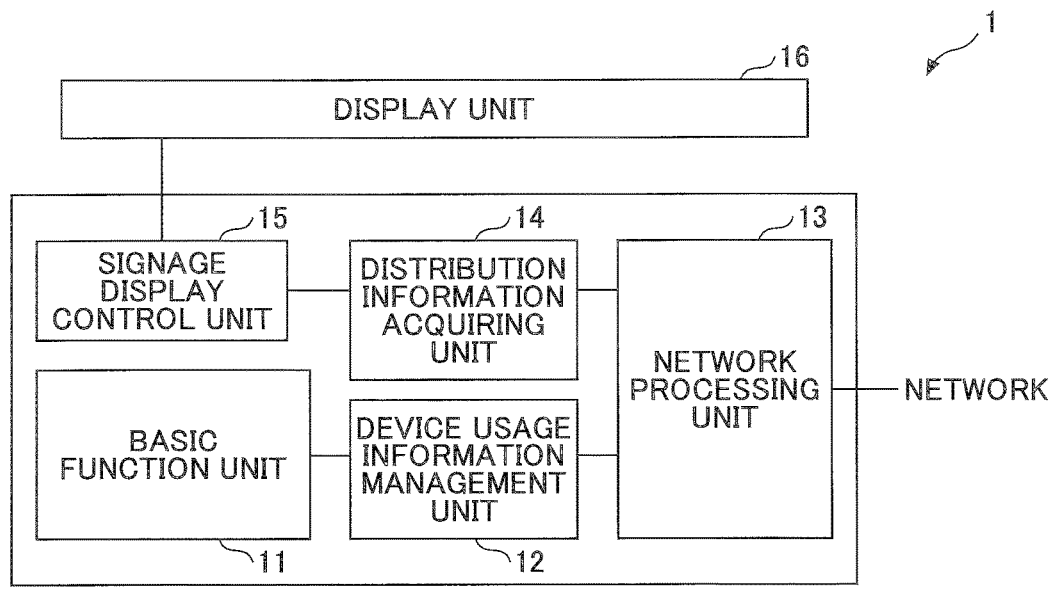
FIG. 4 illustrates a software configuration example of the electronic device.

FIG. 4 illustrates a software configuration example of the electronic device 1. In FIG. 4, the electronic device 1 includes a basic function unit 11, a device usage information management unit 12, a network processing unit 13, a distribution information acquiring unit 14, a signage display control unit 15, and a display unit 16. The basic function unit 11 is the part that fulfills the function that the electronic device 1 inherently has. For example, this is a part that operates as an MFP, a printer, a projector, an interactive whiteboard, or a TV conference terminal. The device usage information management unit 12 is a part that performs a process of collecting information that varies according to the usage status of the electronic device 1 and reporting the information to the contents center 3. The network processing unit 13 is a part that performs a process of receiving a report request from the device usage information management unit 12 and sending a report to the contents center 3 via the network 2, and that receives the contents from the contents center 3 via the network 2 and transfers the contents to the distribution information acquiring unit 14. The distribution information acquiring unit 14 is a part that receives contents from the network processing unit 13, and transfers the contents to the signage display control unit 15. The signage display control unit 15 is a part that performs a process of displaying the contents that have been received from the contents center 3. The display unit 16 corresponds to a panel display unit in the case of an MFP or a printer, corresponds to a projection unit for projecting an image on a screen in the case of a projector, an image output unit in the case of a TV conference system, and a display board unit in the case of an interactive whiteboard.

Figure 5:
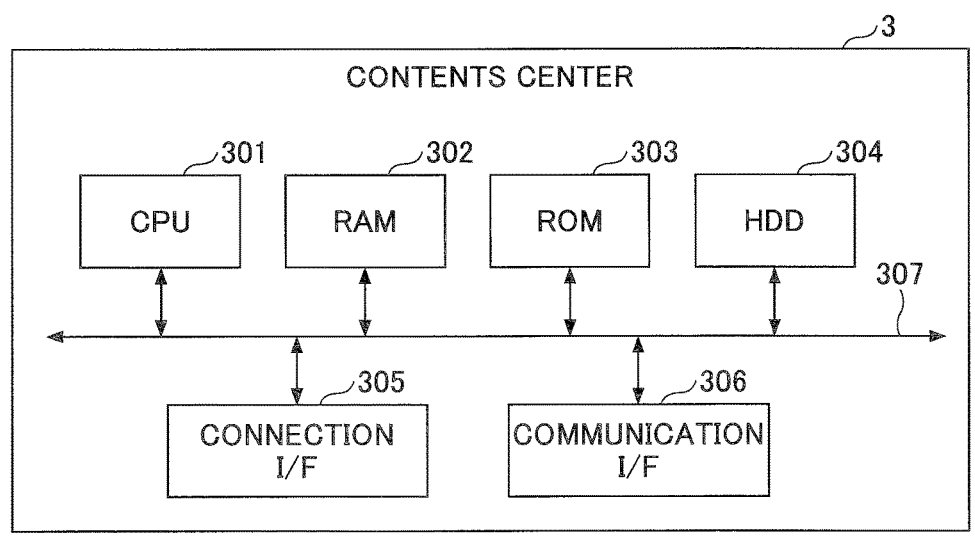
FIG. 5 illustrates a hardware configuration example of a contents center.

FIG. 5 illustrates a hardware configuration example of the contents center 3. In FIG. 5, the contents center 3 includes a CPU 301, a RAM 302, a ROM 303, a HDD 304, a connection I/F 305, and a communication I/F 306, which are connected to each other by a bus 307. The CPU 301 totally controls the operations of the contents center 3 by executing programs stored in the ROM 303, the HDD 304, etc., by using the RAM 302 as a work area. The connection I/F 305 is an interface between the contents center 3 and a device connected to the contents center 3. The communication I/F 306 is an interface for communicating with another information processing apparatus via the network 2 (FIG. 1).

Figure 6:
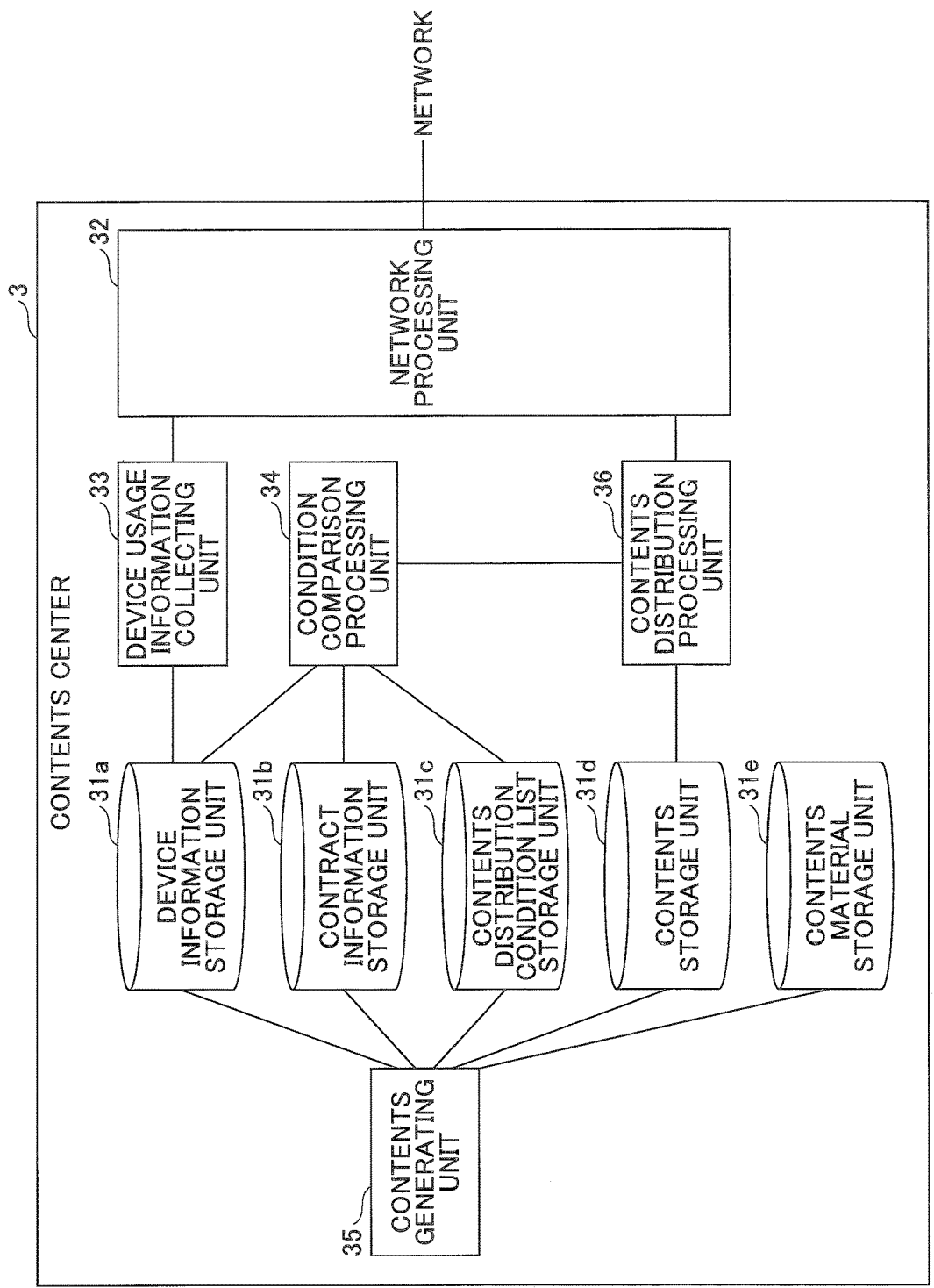
FIG. 6 illustrates a software configuration example of the contents center.

FIG. 6 illustrates a software configuration example of the contents center 3. In FIG. 6, the contents center 3 includes, as data holding areas, a device information storage unit 31a, a contract information storage unit 31b, a contents distribution condition list storage unit 31c, a contents storage unit 31d, and a contents material storage unit 31e. Furthermore, the contents center 3 includes a network processing unit 32, a device usage information collecting unit 33, a condition comparison processing unit 34, a contents generating unit 35, and a contents distribution processing unit 36.

The device information storage unit 31a is a part that stores the latest device information for each device ID, with respect to a plurality of (multiple) electronic devices 1. Details of the device information are described below. The contract information storage unit 31b is a part that stores the contract information for each device ID. Details of the contract information are described below. The contents distribution condition list storage unit 31c is a part that stores a contents distribution condition list including a list of conditions for distributing contents. Details of the contents distribution condition list are described below. The contents storage unit 31d is a part that stores the contents that are to be distributed. Details of the contents are described below. The contents material storage unit 31e is a part that stores information to be used as materials for generating contents, and information of a product or a service for which sales promotion is to be conducted, is stored together with information of the features (assumed usage frequency, etc.) of the corresponding product or service. Details of the contents materials are described below.

The network processing unit 32 is a part that performs a process of receiving a report of device usage information from the network 2 and sending the device usage information to the device usage information collecting unit 33, and a process of sending the target content to the electronic device 1 having the target device ID, in response to a request from the contents distribution processing unit 36.

The device usage information collecting unit 33 is a part that stores, in the device information storage unit 31a, device information to which a report of the device usage information received from the electronic device 1, has been applied.

The condition comparison processing unit 34 is a part that requests the contents distribution processing unit 36 to perform distribution, when there is a conforming device ID, based on the device information stored in the device information storage unit 31a, contract information stored in the contract information storage unit 31b, and the respective contents distribution conditions included in the contents distribution condition list stored in the contents distribution condition list storage unit 31c, for each device ID.

The contents generating unit 35 is a part that generates content for each device ID from the device information stored in the device information storage unit 31a and the contents material storage unit 31e, based on the contract information stored in the contract information storage unit 31b, and stores the generated contents in the contents storage unit 31d.

The contents distribution processing unit 36 is a part that performs a process of distributing a content that is a target in the contents storage unit 31d, by receiving a distribution request.

Figure 7:
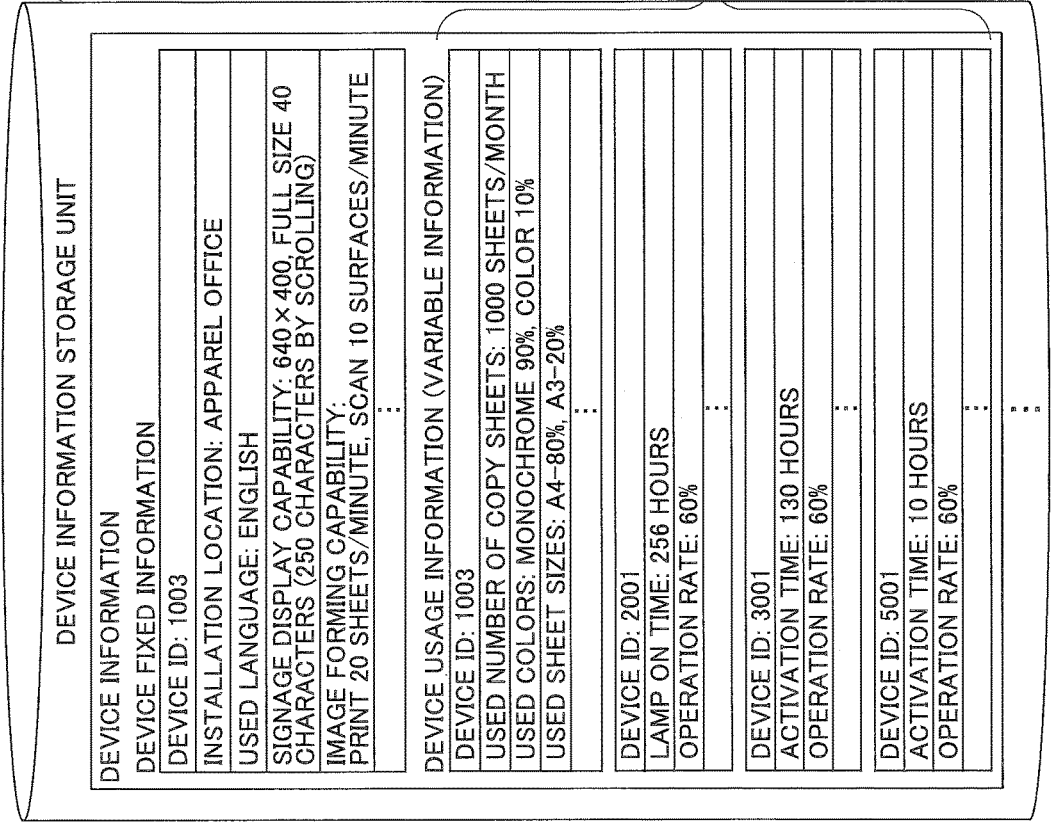
FIG. 7 illustrates a data structure example of device information and various reports.

FIG. 7 illustrates a data structure example of device information and various reports. The device information stored in the device information storage unit 31a includes device fixed information and device usage information (variable information). The device fixed information includes the installation location, the used language, the signage display capability, the image forming capability, etc., which are associated with the device ID. The device fixed information is set in the contents center 3 when the device is installed, or is reported together with the variable information when making periodic reports. The device usage information includes the used number of copy sheets, the used colors, the used sheet sizes, the lamp on time, the activation time, the operation rate, etc., which are associated with the device ID. The counter report, the toner information report, and the lamp on time report, which are sent from the electronic device 1, are applied to the device usage information. The counter report, the toner information report, and the lamp on time report may be directly stored in the received format, as part of the device usage information. The device usage information is periodically reported to the contents center 3 from an electronic device 1 that has entered into a maintenance contract, and the device usage information is automatically updated in the contents center 3 on a monthly basis, etc., as management information. Usually, the management information used for resupplying sheets, charging, etc.

Figure 8:
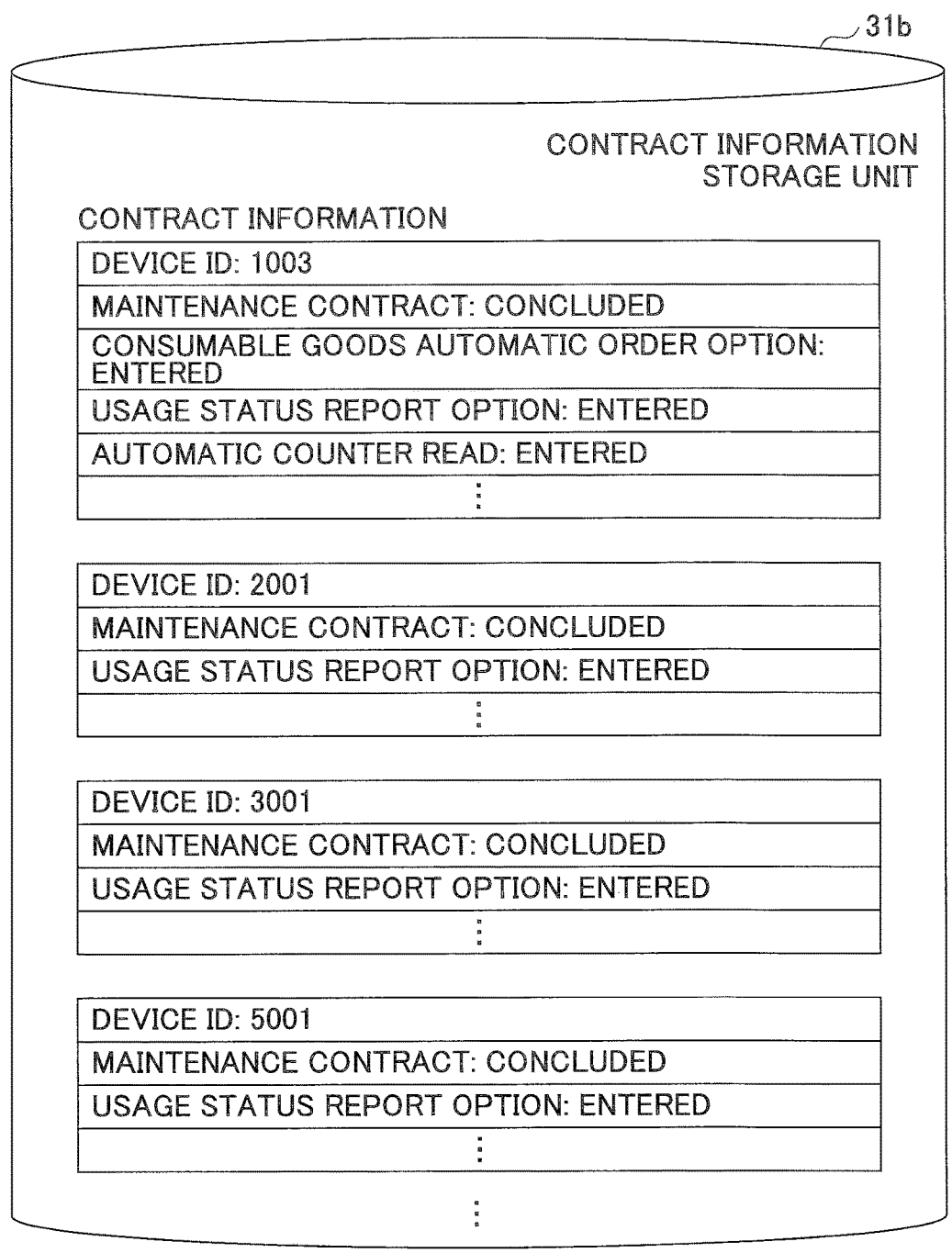
FIG. 8 illustrates a data structure example of contract information.

FIG. 8 illustrates a data structure example of contract information. The contract information stored in the contract information storage unit 31b includes indications as to whether a contract has been entered into, with respect to a maintenance contract, a consumable goods automatic order option, a usage status report option, automatic counter read, etc., which are associated with the device ID. These are registered in the contract information storage unit 31b by the center operator when the device is installed. FIG. 8 illustrates examples of part of the contract information of an MFP (model ID: 1003), a projector (model ID: 2001), an interactive whiteboard (model ID: 3001), and a TV conference terminal (model ID: 5001).

Figure 9A:
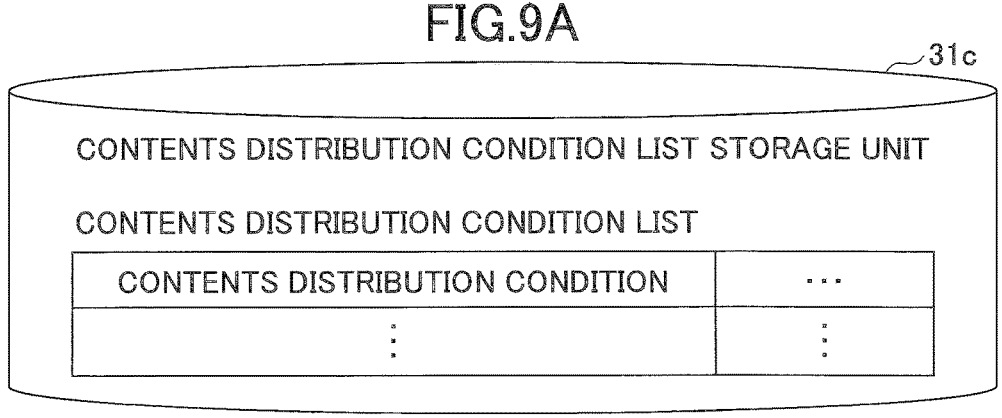
FIGS. 9A through 9C illustrate data structure examples of a contents distribution condition list, contents, and contents material, respectively.
Figure 9B:
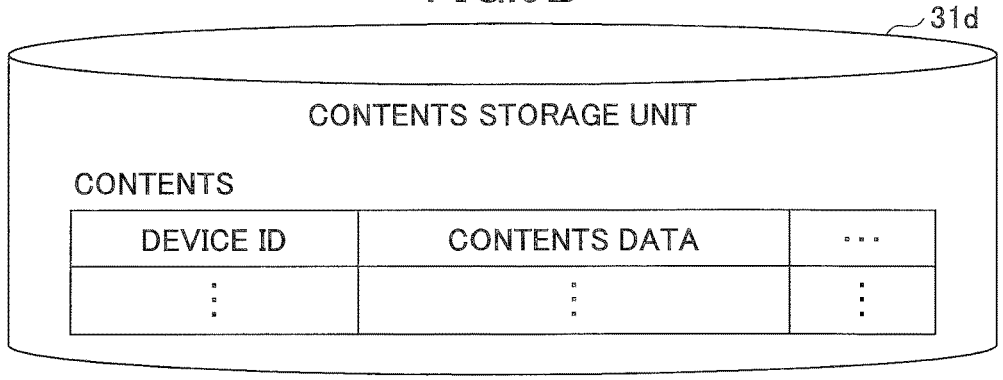
Figure 9C:
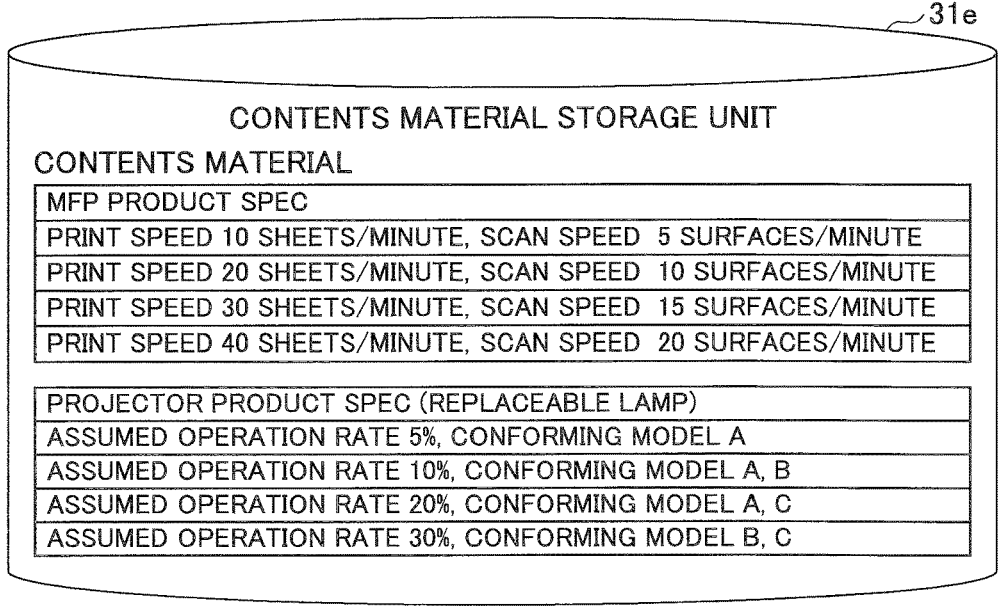

FIGS. 9A through 9C illustrate data structure examples of a contents distribution condition list, contents, and contents material, respectively. The contents distribution condition list stored in the contents distribution condition list storage unit 31c includes contents distribution conditions. An example of contents distribution conditions is "when the usage status report option contract in the contract information is entered into, and the device information has been collected for a predetermined period, the usage status report is distributed".

The contents stored in the contents storage unit 31d include device IDs and contents data. The contents data may be the main body of the data or may be a reference such as a URI indicating the main body of the data. Furthermore, the contents data may include a display condition. For example, a specification may be made to display the contents only when the user who is logging in the electronic device 1 is an "administrator". Furthermore, an indication as to whether the distribution has been completed may be recorded in the contents to prevent overlapping distributions, or the contents may be erased or moved to another area after distribution.

The contents material stored in the contents material storage unit 31e includes the MFP product spec and the projector product spec (replaceable lamp), with respect to a product for which sales promotion is to be conducted. Furthermore, catalog images of the products are stored.

<Operations>

FIG. 10 is a sequence diagram of a process example of the above embodiment. In FIG. 10, the device usage information collecting unit 33 of the contents center 3 periodically performs polling with respect to the electronic device 1 via the network processing unit 32 (step S11), and the device usage information management unit 12 of the electronic device 1 returns a counter report, a toner report, etc. (step S12). Note that instead of polling, the electronic device 1 may spontaneously send a counter report, a toner report, etc., to the contents center 3. For example, when the electronic device 1 is an MFP, the electronic device 1 periodically reports to the contents center 3, as a counter report, information of a color total counter for counting the total number of sheets on which color printing has been performed, a monochrome total counter for counting the total number of sheets on which monochrome printing has been performed, a 2 in 1 print counter for counting the number of sheets on which 2 in 1 printing has been performed, an A4 size print counter and an A3 size print counter for the respective sizes, a double-sided print counter, a counter for each application (copy, printer, fax), etc. (FIG. 7) As a toner information report, the electronic device 1 reports the toner remaining amount of each of black, cyan, magenta, and yellow (FIG. 7). When the electronic device 1 is a projector, the electronic device 1 reports to the contents center 3 as a lamp on time report, the lamp on time and the operation rate (the ratio of the lamp on time with respect to the elapsed time from when the device is installed).

The device usage information collecting unit 33 of the contents center 3 that has received a counter report, a toner report, a lamp on time report, etc., applies the contents of the counter report, the toner report, etc., to the device information in the device information storage unit 31a, and stores the information (step S13).

Subsequently, the contents generating unit 35 of the contents center 3 generates contents from the device information stored in the device information storage unit 31a and the contents material stored in the contents material storage unit 31e, based on the contract information stored in the contract information storage unit 31b, and stores the contents in the contents storage unit 31d (step S14). For example, the contents generating unit 35 extracts the electronic device that has entered into the usage status report option contract based on the contract information, and generates a usage status report from the device usage information of the electronic device. Then, the contents generating unit 35 includes sales promotion information of a product/service in this usage status report, to generate the contents.

Figure 11:
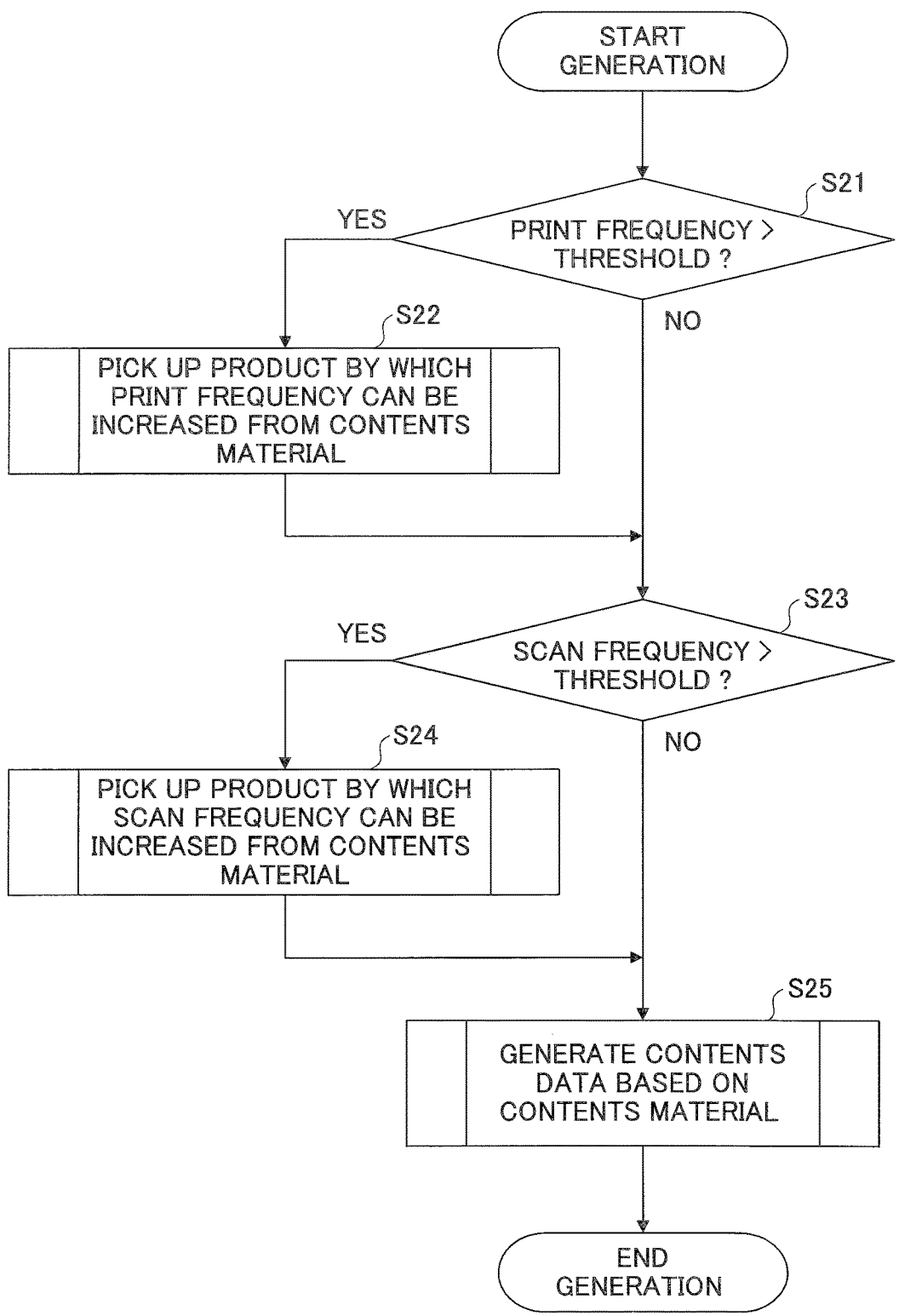
FIG. 11 is a flowchart of a process example of contents generation (part 1)

FIG. 11 is a flowchart of a process example of contents generation, which is a process example of generating sales promotion information for a product/service to be included in the usage status report when the electronic device 1 is an MFP. In FIG. 11, when the process starts, the contents generating unit 35 determines whether the print frequency exceeds a predetermined threshold, for each target device ID (step S21). This threshold is an assumed print frequency with respect to the device used by the user, and is a print amount within a predetermined period assumed by the manufacturer from the viewpoint of an appropriate standby time, etc. When the print frequency exceeds a predetermined threshold (YES in step S21), the contents generating unit 35 extracts (picks up) a product by which the print frequency can be increased, from the contents material (step S22).

Furthermore, the contents generating unit 35 determines whether the scan frequency exceeds a predetermined threshold (step S23). This threshold is an assumed scan frequency with respect to the device used by the user, and is a scan amount within a predetermined period assumed by the manufacturer from the viewpoint of an appropriate standby time, etc. When the scan frequency exceeds a predetermined threshold (YES in step S23), the contents generating unit 35 extracts a product by which the scan frequency can be increased, from the contents material (step S24).

Note that the above threshold is determined by the monthly image forming amount capacity assumed from the image forming capability of the device. More specifically, the threshold may be calculated as follows.

threshold=print speed (or scan speed)×8 hours (operation time in one day)×assumed operation rate×20 days The assumed operation rate is the operation rate assumed by the manufacturer from the viewpoint of an appropriate standby time, etc. (the ratio of the operation time of printing or scanning with respect to the time during which the power is on), and depends on the quality of the product.

Then, the contents generating unit 35 generates contents data based on the contents material (step S25).

That is, when the print frequency and scan frequency is higher than the threshold, the contents generating unit 35 extracts, as an alternative product, a product by which the print frequency and scan frequency do not exceed the image forming amount capacity, from the product spec information in the contents material storage unit 31e. An alternative product is a product assumed to be replaced with the product presently being used. Furthermore, the contents generating unit 35 extracts, as an additional product, a product by which the print frequency and scan frequency do not exceed the image forming amount capacity, when the spec of the present product and the spec of the additional product are combined. An additional product is a product assumed to be additionally introduced, while maintaining the product that is presently used. The additional product may be a product of the same type as the present product (for example, a different MFP is introduced in addition to the MFP presently used), or a product of a different type from the present product (for example, an optional device such as a finisher is added to the MFP presently used). Then, the contents generating unit 35 generates a catalog image of the extracted product, together with a predetermined message, in the report. The predetermined message is for prompting the user to replace the present product with a product having a higher processing capability or to introduce an additional product, when the device being used is used by a higher frequency than the assumed frequency, based on the monthly number of print sheets and the number of scan sheets.

Figure 12A:
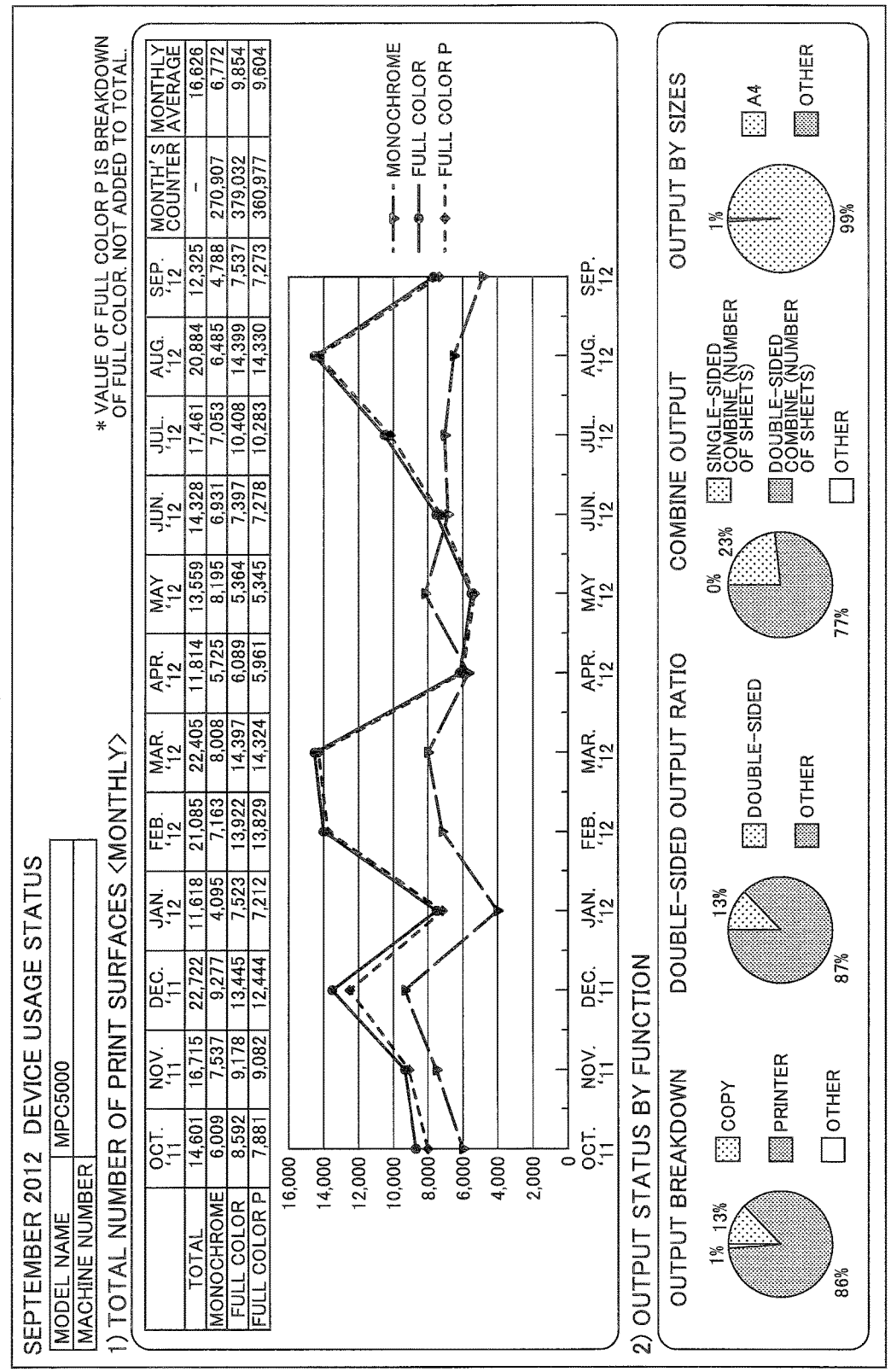
FIG. 12A illustrates an example of distribution information (part 1)

FIG. 12A illustrates an example of a usage status report as the distribution information. The usage status report in FIG. 12A includes the total number of print sheets (number of surfaces) and the output status by function. The total number of print sheets includes, for each month, the total number of print sheets, the number of sheets of monochrome printing, the number of sheets of full color printing, and the number of sheets that have been output by the printer (full color p) among the number of sheets of full color printing. The output status by function includes the breakdown of the output by function (copy, print, other), the ratio of double-sided output, the ratio of combine output, and the ratio by size (A4/other).

FIG. 12B illustrates an example of sales promotion information of a product/service that is continued from the usage status report of FIG. 12A. In the example of FIG. 12B, the recommendation information includes a message reading "There are periods where the print usage frequency is very high, and the business efficiency may be reduced. By replacing with product A having a high processing capability, or by additionally installing product B, it is possible to improve the business efficiency in busy seasons.", together with detailed information of product A and product B. The user can recognize that the image forming demand is exceeding the image forming amount capacity of the used device and the business efficiency is declining, and can also recognize that the problem can be solved by introducing the product/service in the sales promotion information.

Figure 13:
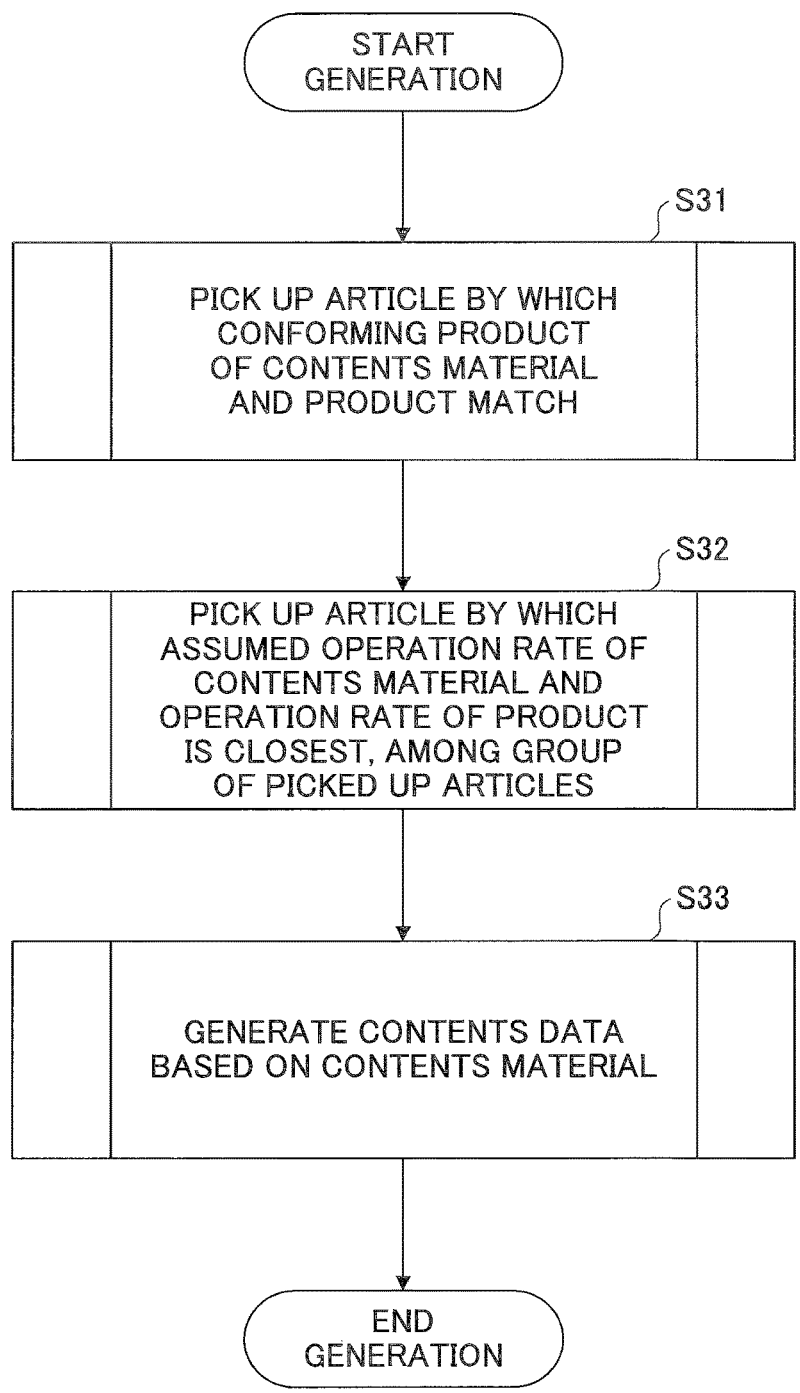
FIG. 13 is a flowchart of a process example of contents generation (part 2)

FIG. 13 is a flowchart of another process example of contents generation, which is a process example of generating sales promotion information for a product/service to be included in the usage status report when the electronic device 1 is a projector. In FIG. 13, when the process starts, the contents generating unit 35 extracts (picks up) an article by which a conforming product of the contents material and the present product match, for each target device ID (step S31). Next, the contents generating unit 35 extracts, from the group of extracted articles, an article by which assumed operation rate of the contents material and the operation rate of the present product are closest (step S32). Then, the contents generating unit 35 generates contents data based on the contents material (step S33).

That is, the contents generating unit 35 extracts an article by which the conforming model matches the present projector, from the operation rate and the projector product spec of the target projector, and creates contents data such that all of the extracted articles are displayed in a report. Furthermore, the contents generating unit 35 extracts an article by which the assumed operation rate is closest to the present projector, and by which the conforming model matches the present projector, and creates contents data displaying a message of recommending an extracted article. FIG. 14 illustrates an example of a usage state report and sales promotion information of a product/service. In the example of FIG. 14, the total operation time and the operation rate are included in the operation status, and the recommendation information includes a message reading "The shelf life of the lamp is approaching. Article A and article B are lamps that can be mounted. Your usage frequency is relatively low, and therefore the low-priced article A is recommended." as well as detailed information of article A and article B.

Note that the above specific description is given of an MFP and a projector; however, also with respect to an interactive whiteboard and a TV conference terminal, when the usage frequency (operation rate) is high, other people cannot use the device, and therefore this problem can be solved by recommending an additional purchase. A recommended product is, for example, a product presently used by the user or a subsequent model of the present product.

Referring back to FIG. 10, subsequently, the condition comparison processing unit 34 of the contents center 3 performs condition comparison for each device ID, based on the device information stored in the device information storage unit 31a, the contract information stored in the contract information storage unit 31b, and the contents distribution conditions in the contents distribution condition list stored in the contents distribution condition list storage unit 31c (step S15). For example, the condition comparison processing unit 34 determines whether the electronic device has entered into a usage status report option contract by the contract information, and the device usage information has been collected for a predetermined period.

Then, when there is a conforming device ID, the condition comparison processing unit 34 of the contents center 3 requests the contents distribution processing unit 36 to distribute the corresponding contents (step S16).

Upon receiving this request, the contents distribution processing unit 36 of the contents center 3 extracts corresponding contents from the contents storage unit 31d (for example, a usage status report and sales promotion information), and sends contents data to the electronic device 1 indicated by the device ID (step S17).

The electronic device 1 that has received the contents data displays the contents on the display unit 16 (FIG. 4), via the distribution information acquiring unit 14 and the signage display control unit 15 (step S18). Note that when a user is operating the electronic device 1 or when a process that makes it difficult to display the contents is performed, the display of the contents is delayed until the electronic device 1 is placed into a standby state. Furthermore, when a display condition is specified for the contents (for example, to only display for the administrator user), the contents are displayed according to the restriction.

Note that in the above process example, the contents generating unit 35 first generates the contents, and subsequently, the condition comparison processing unit 34 determines the distribution; however, the contents may be generated in response to a request from the condition comparison processing unit 34, when the condition comparison processing unit 34 makes the determination to distribute the contents.

<Overview>

As described above, according to the present embodiment, it is possible to make the information that the contents provider wants to distribute, to match the information that the user needs, and enhance the effectiveness of contents distribution.

The information distribution system, the information distribution apparatus, and the information distribution method are not limited to the specific embodiments described herein, and variations and modifications may be made without departing from the spirit and scope of the present invention. That is, the present invention is not to be construed as being limited by the details of the specific examples and the attached drawings.

The device usage information collecting unit 33 is an example of a "device usage information collecting unit". The contents generating unit 35 is an example of a "distribution information generating unit". The contents distribution processing unit 36 is an example of a "distributing unit". The contract information storage unit 31b is an example of a "contract information storing unit".

According to one embodiment of the present invention, an information distribution system, an information distribution apparatus, and an information distribution method are provided, which are capable of making the information that the contents provider wants to distribute, to match the information that the user needs, and enhancing the effectiveness of contents distribution.

The present application is based on and claims the benefit of priority of Japanese Priority Patent Application No. 2014-208247, filed on Oct. 9, 2014, the entire contents of which are hereby incorporated herein by reference.

What is claimed is:

1. An information distribution system comprising a printer and an information distribution apparatus,
the printer including:
a main unit including a first hardware processor and a first hardware memory that contains first operating system software of a first type; the main unit configured to implement a printing operation; and
an operation unit including a second hardware processor, a second hardware memory that contains second operating system software of a second type that is different than the first type, and an operation panel; the operation unit configured to receive input according to user operations, and display information;
wherein the first hardware processor of the main unit implements the printing operation, and reports execution information of the printing operation to the operation unit; and
wherein the second hardware processor of the operation unit displays, on the operation panel of the operation unit, a usage status report generated by the information distribution apparatus; and
the information distribution apparatus connected to the printer through a network, and including a third hardware processor and a hardware memory containing instructions, which when executed, cause the third hardware processor to:
collect, through the network, printing operation execution information from the printer;
generate, when a usage frequency of the printer exceeds a predetermined usage frequency, information of an alternative printer that has a capacity that is not exceeded by the usage frequency of the printer, based on the printing operation execution information collected through the network;
generate the usage status report from the collected printing operation execution information of the printer, the usage status report including a tally obtained from the printing operation execution information, and the generated information of the alternative printer; and
distribute, through the network, the usage status report to the printer.

2. The information distribution system according to claim 1, wherein the instructions, when executed, cause the third hardware processor to:
generate information of an alternate printer having an operation rate that is within a range of an assumed operation rate of the printer.

3. The information distribution system according to claim 1, wherein the instructions, when executed, cause the third hardware processor to:
store contract information of the printer, and
generate the usage status report based on the contract information.

4. The information distribution system according to claim 1, wherein the first operating system software includes Linux operating system software, and the second operating system software includes Android operating system software.

5. An information distribution method executed by a printer and an information distribution apparatus in an information distribution system in which the printer and the information distribution apparatus are connected to each other via a network, the printer including a main unit including a first hardware processor and a first hardware memory that contains first operating system software of a first type; the main unit configured to implement a printing operation; and an operation unit including a second hardware processor, a second hardware memory that contains second operating system software of a second type that is different than the first type, and an operation panel, the operation unit configured to receive input according to user operations, and display information, the information distribution method comprising:

- implementing, by the first hardware processor of the main unit, the printing operation, and reporting, by the first hardware processor of the main unit, execution information of the printing operation to the operation unit;
- displaying, by the second hardware processor of the operation unit, on the operation panel of the operation unit, a usage status report generated by the information distribution apparatus; and
- collecting, through the network by the information distribution apparatus, printing operation execution information from the printer;
- generating, by the information distribution apparatus, when a usage frequency of the printer exceeds a predetermined usage frequency, information of an alternative printer that has a capacity that is not exceeded by the usage frequency of the printer, based on the printing operation execution information collected through the network by the information distribution apparatus;
- generating, by the information distribution apparatus, the usage status report from the collected printing operation execution information of the printer, the usage status report including a tally obtained from the printing operation execution information, and the generated information of the alternative printer; and
- distributing, through the network, the usage status report to the printer.

* * * * *